C. SLATTERY.
BRICK MOLDING MACHINE.
APPLICATION FILED NOV. 6, 1919.

1,354,224.

Patented Sept. 28, 1920.
3 SHEETS—SHEET 3.

INVENTOR,
Charles Slattery
By John A. Bornhardt
ATT'Y.

UNITED STATES PATENT OFFICE.

CHARLES SLATTERY, OF CUYAHOGA FALLS, OHIO.

BRICK-MOLDING MACHINE.

1,354,224.  Specification of Letters Patent.  Patented Sept. 28, 1920.

Application filed November 6, 1919. Serial No. 335,986.

*To all whom it may concern:*

Be it known that I, CHARLES SLATTERY, a citizen of the United States, residing at Cuyahoga Falls, in the county of Summit and State of Ohio, have invented certain new and useful Improvements in Brick-Molding Machines, of which the following is a specification.

This invention relates to a machine for molding bricks and is particularly adapted for repressing the same after they have been given a preliminary forming as they emerge from the plunger press.

Heretofore it has been impossible to repress brick sufficiently without so affecting the grain thereof as to cause the cracking of the brick, the methods heretofore employed being so constructed as to exert pressure longitudinally against the grain, this tended to spread the grain in such a manner as to weaken the brick materially. The principal object, therefore, of this invention, is to so present the brick to the mold that pressure, being exerted laterally against the grain, will tend to compress rather than spread the grain, this so affecting the brick as to make it immune from further cracking.

The device consists of a wheel which is intermittently rotated and is provided with a series of forming molds about its periphery. It also comprises means for compressing the brick within the mold and means for conveying said brick away from the mold.

A further object of the invention is to provide a machine which will be simple in construction, and positive in action, and the provision of means for measuring each brick, said means operating automatically with the other parts of the machine.

Figure 1:
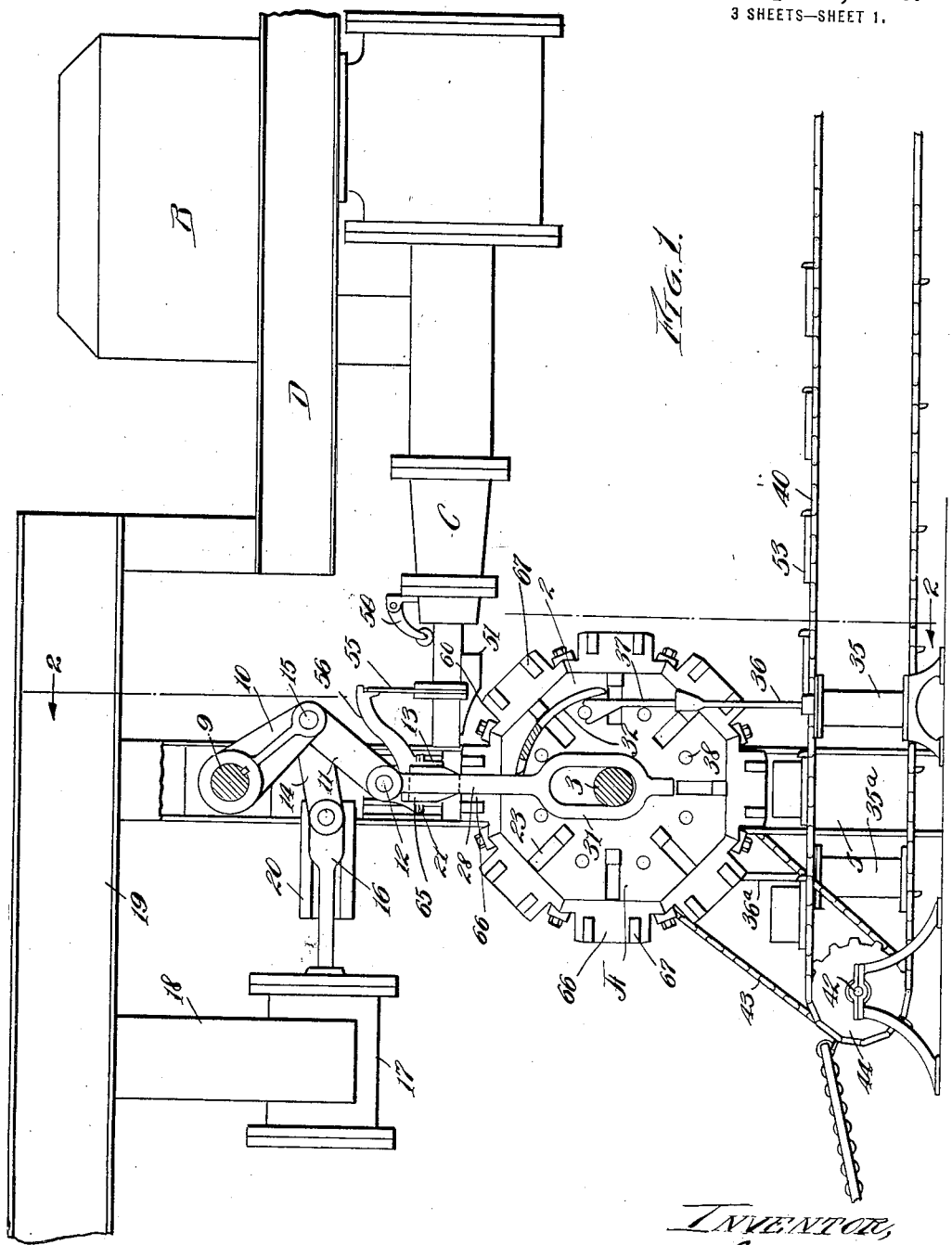
Figure 2:
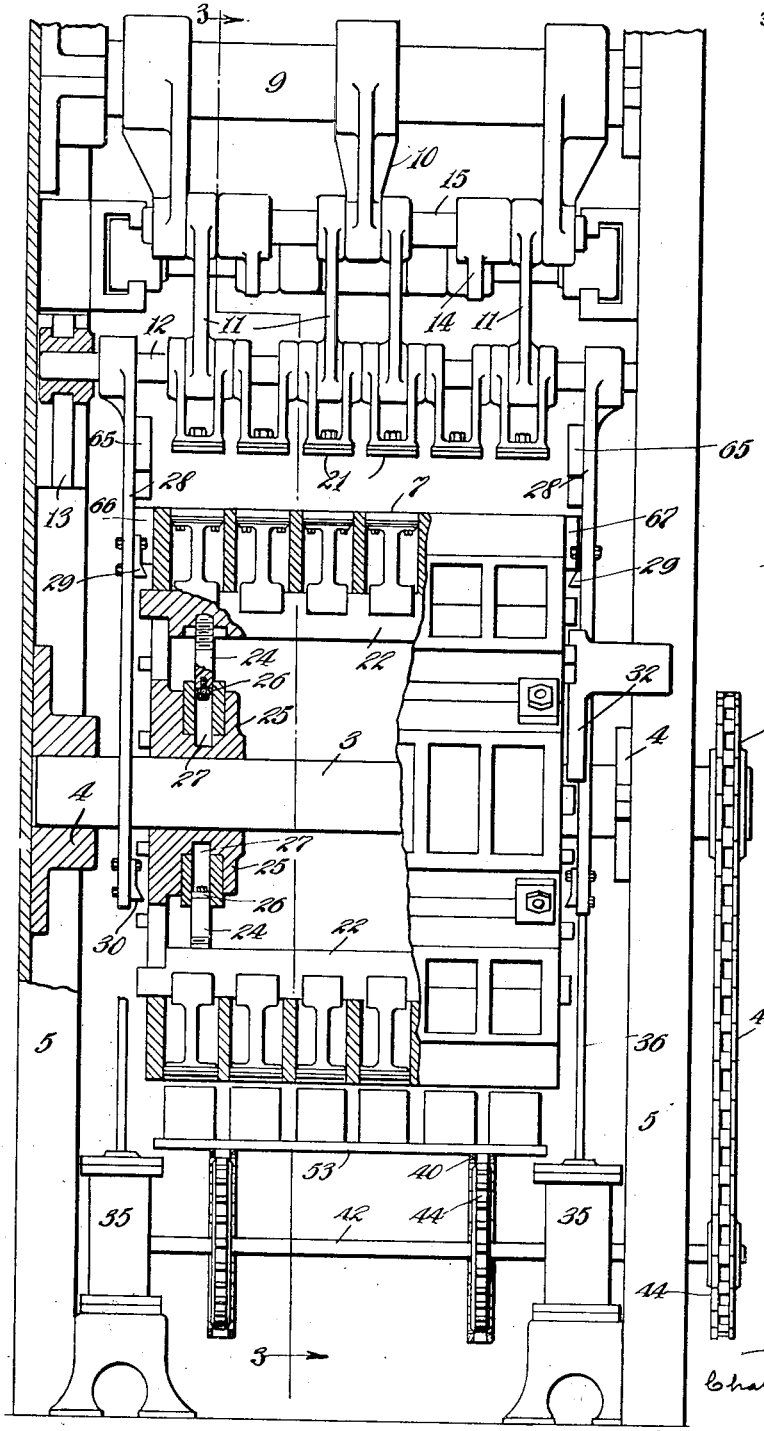
Figure 3:
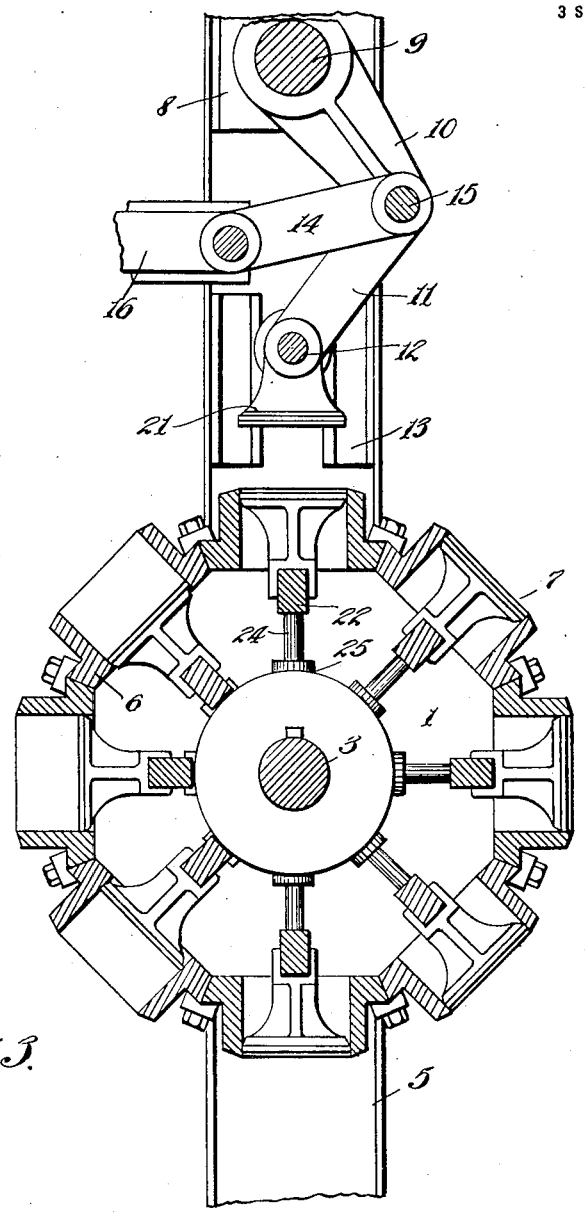

In the accompanying drawings wherein like reference numerals designate similar parts of reference throughout the various views, Figure 1 is a side elevation of the apparatus, certain parts being broken away for clearness of illustration; Fig. 2 is a sectional elevation on the line 2—2 of Fig. 1 and Fig. 3 is a transverse section through the mold wheel as indicated on the line 3—3 of Fig. 2.

The machine hereinafter described is so designed and proportioned as to be used primarily for the manufacture of paving brick but it is obvious that by varying the proportions the same may be adapted for use in the manufacture of other types of brick.

As illustrated in the accompanying drawings the mechanism comprises the brick pressing mechanism indicated generally at A, a pug-mill B from which is conducted in a solid rectangular bar the plastic material of which bricks are made, through the discharge opening C, and the parts B and C are supported in a position relative to the forming mechanism A by means of the structural iron work D.

The means for repressing the brick comprises the aforementioned mold wheel which consists of two octagonal heads 1 and 2. These heads are supported at opposite ends of a shaft 3 which in turn is allowed rotation within bearings 4 secured in vertical channels 5. About their periphery the plates have secured to them a plurality of rectangular molds 6 which are provided with movable bottoms 7 whereby the bricks are ejected after the pressing operation has been performed upon them. Supported within suitable bearings 8 within the channel irons 5 and immediately above the mold wheel is a transverse shaft 9 upon which is keyed one arm 10 of a toggle, the other arm 11 of which is secured to a cross head pin 12, said head being permitted vertical movement within the guides 13 also carried by the vertical channel irons 5. At the middle of the toggle a link 14 is fixed to the shaft 15 which forms the pivot point of the toggle and has its opposite end secured to a piston rod 16, the piston of which reciprocates within a cylinder 17 suitably supported by the structural work 18 and 19. The piston rod 16 is preferably guided within horizontal guides 20 carried by the vertical channel irons 5 whereby to provide sufficient stability to these parts. The shaft 12 which is moved vertically by the toggle joint hereinbefore referred to has secured to it a plurality of plungers 21, here shown as being six in number, and these plungers are rectangular in plan and are of a size corresponding to the inside dimensions of the mold and at the proper time act in conjunction with the bottom members 7 to efficiently repress the brick as will be more fully described hereinafter.

The before referred to bottoms 7 are mounted upon suitable cross heads 22, the ends of which are guided within radial slots 23 provided therefor in the heads 1 and 2, said cross heads being prevented from lateral movement by the cylindrical projections 24 which have one of their ends threaded into the cross heads and the opposite end slidably mounted within bores in the hub 25 of the heads 1 and 2. These projections 24 have secured to that end which reciprocates within the hub 25 a suitable packing gasket 26 which upon its downward thrust within the bore 27 in the head 25 creates sufficient compression of air within the cylinder to act as an air cushion, thereby to prevent an excessive strain upon the cross head and its associated parts during the preliminary pressing operation. These cross heads are caused to move downwardly at the proper intervals by a vertically movable actuating arm 28 which is carried by the shaft 12 and which is provided at its lower end and also substantially at its central portion with pawls 29 and 30. This bar is prevented from swinging by straddling the shaft 3 as clearly shown in Fig. 1, at 31.

The bottoms 7 are held in position at the top of the molds during part of the rotation of the mold wheel by the ends thereof riding upon the top of a cam 32 which is supported in a fixed position by being bolted to the vertical guides or channel irons 5. Means for intermittently rotating the wheel comprise two air cylinders 35 and 35ᵃ which are supported at each side and beneath the mold wheel, the pistons of which have secured to them the customary piston rods 36 and 36ᵃ. Pivotally mounted upon the ends of each of the aforementioned rods are actuating pawls 37, one of which engages the projections 38 on the head 2 and the other being engaged by like projections on the head 1.

During the upward or driving thrust of the piston 36, which rotates the mold wheel, the pressure against the piston operating within the cylinder 35ᵃ acts in the reverse direction, thus serving to provide a braking effect upon the rotation of the wheel, the combined weight of the wheel and repressed bricks upon that side serving to offset the pressure exerted through the cylinder 35ᵃ sufficiently to allow the piston within the cylinder 35 to perform its function.

To provide means for driving the conveyer indicated at 40 in proper phase with the mold wheel, I provide a sprocket wheel 41 which is rigidly secured upon the end of the shaft 3 and which has connection with the shaft 42 of the conveyer by means of a sprocket chain 43, said chain being mounted upon a suitable sprocket wheel 44 upon the shaft 42.

With the parts constructed as described the plastic brick is fed from the discharge opening C of the plunger press in a plurality of solid bars, the number of bars corresponding to the number of molds within the mold wheel, after the proper length has been fed therefrom the feeding mechanism of the plunger press is momentarily suspended by an electrical contact roller 50 opening a circuit which controls the feeding mechanism. The proper alinement of mold wheels having been obtained by the pawl and ratchet arrangement 35 to 38 inclusive the piston within the cylinder 17 moves in a direction to straighten the toggle arms 10 and 11 and therewith the plungers 21, this causing said plungers to descend in a vertical direction.

It will be understood of course that the plastic material has heretofore been forced by its movement from the plunger press to a point between the plunger 21 and the bottoms 7 of the mold and upon referring to Fig. 3 it will be seen that the bottoms 7 occupy a position on a plane with the top of the molds, this plane being the same as the top of the cutting table 51 over which the bar of plastic material passes. This position of parts is important in that it prevents the form from dropping preliminary to its compressed state. As the plunger 21 starts the downward movement it carries with it the vertical actuating arms 28 whose projections 29 and 30 engage the ends of the cross heads 22 causing the top cross head to descend to the bottom of the mold and the cross head which is diametrically opposite thereof to descend to the top of the mold thereby ejecting the brick which has heretofore been pressed and depositing it upon pallets 53 carried by the conveyer. At the same time the proper proportioned brick is severed from the bar of plastic material at a point adjacent the discharge opening of the plunger press and at the hereinbefore referred to cutting table 51 by means of the cutting knife 55 which is carried by a pair of substantially horizontal arms 56 secured to the vertical actuating member 28, consequently as the bar descends in a downward direction the knife 55 will be carried with it sufficiently to cut from the bar of plastic material a brick of the proper length. It is then fed into the proper position between the bottom 7 and plunger 21 through the action of the plunger press, at this point the severed brick is assisted into its proper position for the repressing operation by the beveled corner 60 of the mold engaging the under side of the brick and guiding it to position, and as said corner continues in its arcuate path it carries the severed brick with it until such time as the mold wheel has assumed its proper position and has come to rest.

After discharging the compressed brick upon the pallet the bottoms 7 of the molds are allowed to retain their position on the plane equal to the top of the molds until they reach a position 180 degrees or one-half the revolution of the mold wheel, and to prevent them from falling by gravity when they reach a position 45 degrees above the horizontal the cam 32 is provided, this cam being concentric with the axis of the wheel and having the projecting end of the cross heads 22 riding upon the top thereof.

After the brick has been sufficiently pressed and has been discharged on the pallet the piston within the cylinder 35 is caused to operate in a direction to elevate the ratchet 37 to engage the projection 38 on the heads 1 and 2 thereby to rotate the mold wheel sufficiently to aline itself properly with respect to the plungers 21, this alinement is preferably obtained by means of the wedge blocks 65, carried by the depending arms 28, entering the recess 66 formed by two parallel projections 67 made integral with the heads 1 and 2 and properly positioned with respect to the center line of each mold. It is evident that various modifications may be used and I do not wish to limit myself further in the construction of the same than is required by the state of the art or that which comes within the scope of the appended claims.

I claim:

1. In a brick machine, the combination with a wheel of molds, and a plunger coöperating therewith, of a feeding table leading to the molds, and a cutter carried by the plunger and adapted to sever material being fed across the table.

2. In a brick machine, the combination with a rotary drum, molds mounted between the ends of the drum, cross bars projecting through the ends of the drum and slidable in radial guides therein ejecting mold bottoms supported by said bars, a plunger coöperating with the molds, and arms carried by the plunger and engaging with the projecting ends of the cross bars when the plunger advances, to advance the mold bottoms and eject the brick from the molds.

3. In a brick machine, a drum having peripheral molds, air cylinders in the drum, and mold bottoms slidable radially in the molds and having pistons working in said air cylinder.

4. In a brick machine, a drum having heads at the ends provided with radial air cylinders, and radial guides, radial molds supported between the heads, cross bars extending between said heads and working in said guides and having pistons working in the cylinders, and movable mold bottoms supported by said bars.

5. In a brick machine, the combination with a rotary drum having peripheral molds and end projections, of a fluid pressure cylinder, piston and piston rod, and a pawl carried by the rod and engageable with said projections in succession, to turn the drum step by step.

6. In a brick machine, the combination with a rotary drum having a series of rows of peripheral radial molds, radially slidable cross bars extending through the drum and projecting beyond the ends thereof, behind the respective rows of molds, movable mold bottoms carried by said cross bars, a plunger coöperating with the rows of molds in succession, and arms connected to the plunger and extending across the ends of the drum and engageable with the projecting ends of diametrically opposite cross bars, to advance one row of mold bottoms and retract the other.

In testimony whereof, I do affix my signature in presence of two witnesses.

CHARLES SLATTERY.

Witnesses:
 D. W. SLATTERY,
 JOHN A. BOMMHARDT.